(12) United States Patent
Nimura et al.

(10) Patent No.: US 8,285,756 B2
(45) Date of Patent: Oct. 9, 2012

(54) OPERATION SUPPORT PROGRAM

(75) Inventors: Kazunobu Nimura, Tatsuno-machi (JP); Minoru Ichimura, Matsumoto (JP); Masaharu Iwatani, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 300 days.

(21) Appl. No.: 12/814,403

(22) Filed: Jun. 11, 2010

(65) Prior Publication Data

US 2010/0318582 A1     Dec. 16, 2010

(30) Foreign Application Priority Data

Jun. 12, 2009 (JP) ................. 2009-140904
Jun. 12, 2009 (JP) ................. 2009-140905
Jun. 12, 2009 (JP) ................. 2009-140906

(51) Int. Cl.
*G06F 17/30* (2006.01)

(52) U.S. Cl. ........ 707/805; 707/634; 707/654; 707/802; 707/806; 707/807; 707/760; 715/700; 715/717; 715/744; 715/746; 715/747; 715/748; 715/751

(58) Field of Classification Search ............ 707/634, 707/654, 760, 802, 805–807; 715/700, 717, 715/744, 746–748, 751
See application file for complete search history.

(56) References Cited

U.S. PATENT DOCUMENTS

| | | | | |
|---|---|---|---|---|
| 6,067,548 A * | 5/2000 | Cheng | ................... | 1/1 |
| 6,158,044 A * | 12/2000 | Tibbetts | ................. | 717/100 |
| 6,237,004 B1 * | 5/2001 | Dodson et al. | .................. | 1/1 |
| 7,284,044 B2 | 10/2007 | Teraoaka et al. | | |
| 7,719,535 B2 | 5/2010 | Tadokoro et al. | | |
| 7,720,742 B1 * | 5/2010 | Mauro et al. | ................ | 705/37 |
| 7,984,060 B2 * | 7/2011 | Payton et al. | ................ | 707/760 |
| 2001/0029530 A1 | 10/2001 | Naito et al. | | |
| 2004/0138964 A1 | 7/2004 | Okada et al. | | |
| 2010/0262937 A1 | 10/2010 | Kawano | | |

FOREIGN PATENT DOCUMENTS

| | | |
|---|---|---|
| JP | 2001-222416 A | 8/2001 |
| JP | 2001-306424 A | 11/2001 |
| JP | 2002-245293 A | 8/2002 |
| JP | 2004-206678 A | 7/2004 |
| JP | 2005-316858 A | 11/2005 |
| JP | 2008-003649 A | 1/2008 |
| JP | 2008-090454 A | 4/2008 |
| JP | 2008-102838 A | 5/2008 |
| WO | WO 02/079968 A1 | 10/2002 |

* cited by examiner

*Primary Examiner* — Frantz Coby
(74) *Attorney, Agent, or Firm* — Kilpatrick Townsend & Stockton LLP

(57) ABSTRACT

An operation support program is stored in a storage medium. The operation support program includes a support database or a plurality of support program components for supporting a plurality of tasks that are different from one another and are carried out as a result of execution of a plurality of device control programs that are different from one another. The operation support program causes a computer to function as constituent sections including: an update data acquiring section; an updating section; and a graphical user interface configuring section.

18 Claims, 5 Drawing Sheets

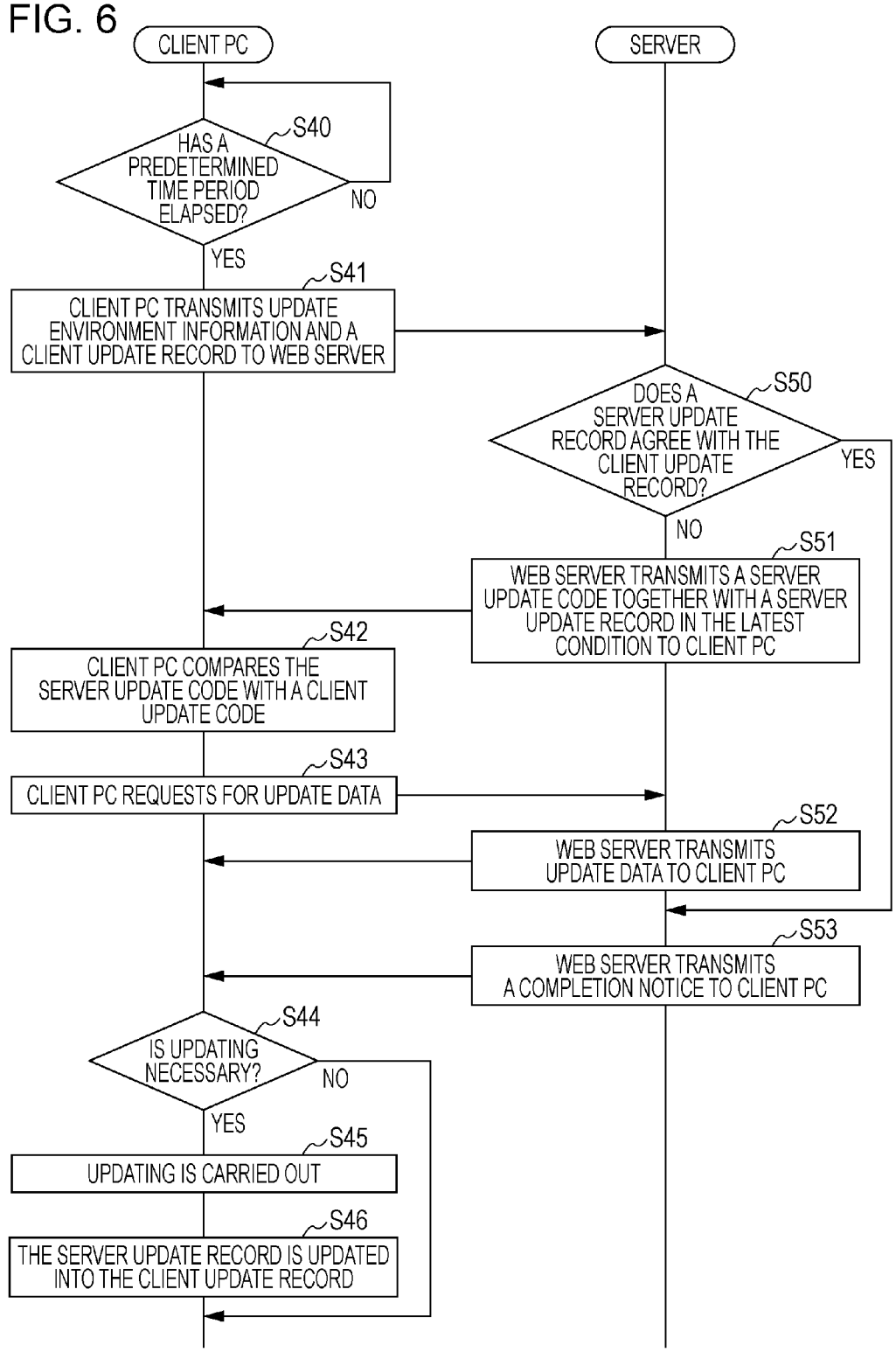

OPERATION SUPPORT PROGRAM

This application claims priority to Japanese Patent Application No. 2009-140904, filed Jun. 12, 2009, Japanese Patent Application No. 2009-140905, filed Jun. 12, 2009, and Japanese Patent Application No. 2009-140906, filed Jun. 12, 2009. The entireties of each of these applications are incorporated by reference herein.

BACKGROUND

1. Technical Field

The present invention generally relates to an operation support program. In particular, the invention relates to an operation support program for supporting a plurality of tasks that are different from one another and are carried out as a result of execution of a plurality of device control programs that are different from one another.

2. Related Art

An operation support program that displays a pop-up message with an embedded URL (Uniform Resource Locator) for linking to a website on which users can purchase consumable supplies is known in the art. The pop-up message appears when the remaining amount of consumable supplies such as ink cartridges, printing paper, and the like reaches a predetermined level. An example of such an operation support program is disclosed in JP-A-2004-206678. Such an operation support program is provided for each device control program. Though a URL that is managed by an operation support program that is installed in a client PC (Personal Computer) is a fixed value, since a plurality of Web servers is located as intermediaries on a route for accessing a website on which users can purchase consumable supplies, it is possible to change a website to which the users are guided even after the distribution of the operation support program merely by changing the URL registered in the Web servers.

In addition, for the purpose of supporting various tasks that are carried out by means of a multi-function device having a printing function, a scanning function, and a facsimile function, an operation support program that configures GUI (Graphical User Interface) corresponding to tasks that are different from one another in a single window in a unified view is also known in the art (refer to JP-A-2004-206678). Related art that has not been published and thus known yet is disclosed in Japanese Patent Application No. 2009-94643. Such an operation support program displays messages with embedded links to, for example, an online manual, FAQ, program update data, a website on which users can purchase consumable supplies, and the like and messages with embedded shortcuts for launching an image retouch program and other programs in a single window.

However, an operation support program of related art offers nothing more than providing fixed links or fixed shortcuts to users by itself. Accordingly, it is difficult to offer Web service with great usability in a finely tuned manner as ever-changing business scene demands. Specifically, in comparison with a case where users have to actively follow a link in order to browse a web page that offers service that they demand, usability is greater in a case where users can passively browse a web page that offers service that they demand. In order to offer such Web service to users, it is necessary to set a link depending on model, frequency in use, locale, language, time, operation state, and the like. To provide various Web-server-linked services or various non-linked services depending on model, frequency in use, locale, language, time, operation state, and the like in a finely-tuned manner for supporting tasks, however, it is necessary to finely set a link for each individual user; in addition, it is necessary to change the content of a linked Web server as business scene changes. Moreover, it is preferable to change GUI of a client PC. To change a unified GUI that consolidates GUIs that are respectively unique to a plurality of device control programs, it is necessary to carry out unified management on the automatic updating of program modules and data respectively unique to the plurality of device control programs. However, a workable solution (function) for carrying out unified management on the automatic updating of a plurality of programs and data working with a plurality of device control programs for implementing functions that are different from one another, for example, the functions of a printer, a scanner, a fax machine, and a digital camera, has not been devised yet.

As another disadvantage, it is not efficient, and practically impossible, to individually develop an operation support program for each device driver or for each device for providing operation support programs that correspond to various device control programs and various devices.

Moreover, as another disadvantage, related-art operation support GUI cannot be automatically activated in response to a change in environment. That is, unless users activate an operation support program, it is not possible to support a plurality of tasks that are different from one another and are carried out as a result of execution of a plurality of device control programs that are different from one another as the situation demands.

SUMMARY

An advantage of some aspects of the invention is to support a plurality of tasks that are different from one another and are carried out as a result of execution of a plurality of device control programs that are different from one another in a finely-tuned and/or individually-targeted manner as the situation demands.

Another advantage of some aspects of the invention is to support a plurality of tasks that are different from one another and are carried out as a result of execution of an arbitrary device control program as the situation demands.

Another advantage of some aspects of the invention is to always support a plurality of tasks that are different from one another and are carried out as a result of execution of a plurality of device control programs that are different from one another as the situation demands on a steady basis.

(1) In order to offer the above advantages without any limitation thereto, an operation support program according to a first aspect of the invention includes a support database or a plurality of support program components for supporting a plurality of tasks that are different from one another and are carried out as a result of execution of a plurality of device control programs that are different from one another. The operation support program according to the first aspect of the invention causes a computer to function as constituent sections including: an update data acquiring section that establishes connection with a server at predetermined timing to acquire update data for updating the support database or the plurality of support program components from the server via communication lines; an updating section that updates the support database or the plurality of support program components on the basis of the update data; and a graphical user interface configuring section that configures a support graphical user interface for supporting the plurality of tasks that are different from one another by utilizing the support database or the plurality of support program components, wherein the update data acquiring section transmits update control information for acquiring the update data in accordance with types of the plurality of device control programs to the server, the update data acquiring section receives a server update record that indicates the last update time of the update data corresponding to the update control information at the server from the server, the update data acquiring section transmits a preceding server update record, which was acquired the last time, as a client update record to the server, and if time indicated by a current server update record, which has been acquired this time, does not agree with time indicated by the client update record, the update data acquiring section acquires the update data from the server and updates the preceding server update record acquired the last time into the current server update record acquired this time. With such features of the first aspect of the invention, it is possible to carry out unified management on the automatic updating of a support database or a plurality of support program components for supporting a plurality of tasks that are different from one another and are carried out as a result of execution of a plurality of device control programs that are different from one another. Therefore, the first aspect of the invention makes it possible to support a plurality of tasks that are different from one another and are carried out as a result of execution of a plurality of device control programs that are different from one another in a finely-tuned and/or individually-targeted manner as the situation demands. In addition, it is possible to reduce the amount of data transmitted via communication lines for the automatic updating of a support database or a plurality of support program components under unified management.

(2) In the operation support program according to the first aspect of the invention, it is preferable that the update control information should include a client update code that indicates the last update state of the support database or the plurality of support program components; if the current server update record acquired this time does not agree with the client update record, the update data acquiring section should acquire a server update code that indicates the last update state of a server data group that corresponds to the plurality of device control programs from the server; the update data acquiring section should make a request to the server for the update data that is necessary for updating the support database that is not in the latest condition or the plurality of support program components that are not in the latest condition on the basis of the client update code and the server update code; and the update data acquiring section should acquire the update data created from the server data group from the server. With such a preferred aspect of the invention, it is possible to further reduce the amount of data transmitted via communication lines for the automatic updating of a support database or a plurality of support program components under unified management.

(3) It is preferable that the operation support program according to the first aspect of the invention should cause the computer to function as the constituent sections further including: a detecting section that detects execution environment, wherein the graphical user interface configuring section configures the support graphical user interface in accordance with the execution environment. With such a preferred aspect of the invention, it is possible to configure a graphical user interface for supporting a plurality of tasks that are different from one another (i.e., support GUI) in a flexible manner depending on the situation. Execution environment, which is environment in which the operation support program is executed, is unique software/hardware environment for each arbitrary client computer.

(4) In the operation support program according to the preferred aspect of the invention, the detecting section may detect statuses or logs of a plurality of devices controlled by the plurality of device control programs. With such a preferred aspect of the invention, it is possible to flexibly configure support GUI depending on the statuses or logs of the plurality of devices.

(5) In the operation support program according to the preferred aspect of the invention, the detecting section may include device API, Application Programming Interface, that is configured as common API for performing communication with the plurality of device control programs to detect the execution environment. Such a preferred aspect of the invention makes it easier to develop a plurality of support program components working respectively with a plurality of devices that are different from one another. Therefore, it is easier to support a plurality of tasks that are different from one another and are carried out as a result of execution of a plurality of device control programs that are different from one another in a finely-tuned and/or individually-targeted manner as the situation demands.

(6) In the operation support program according to the preferred aspect of the invention, the detecting section may detect current time as the execution environment. With such a preferred aspect of the invention, it is possible to configure support GUI on the arrival of predetermined date, time, day of the week or the like.

(7) In the operation support program according to the first aspect of the invention, it is preferable that the graphical user interface configuring section should configure the support graphical user interface in a single window. Such a preferred aspect of the invention makes it easier to carry out various tasks that are carried out as a result of execution of a plurality of device control programs that are different from one another.

(8) In the operation support program according to the first aspect of the invention, it is preferable that the graphical user interface configuring section should display a message by utilizing the support database or the plurality of support program components, where the selection of the message triggers displaying of a web page for supporting the plurality of tasks that are different from one another. With such a preferred aspect of the invention, it is difficult to offer Web service with great usability in a finely tuned manner as ever-changing business scene demands.

(9) In order to offer the above advantages without any limitation thereto, an operation support program according to a second aspect of the invention includes a support database for supporting a plurality of tasks that are different from one another and are carried out as a result of execution of a plurality of device control programs that are different from one another. The operation support program according to the second aspect of the invention causes a computer to function as constituent sections including: a detecting section that detects execution environment; and a graphical user interface configuring section that changes configuration of a support graphical user interface for supporting the plurality of tasks that are different from one another by utilizing the support database in response to a change in the execution environment, wherein the graphical user interface configuring section displays a message selection of which triggers displaying of a web page for supporting the plurality of tasks that are different from one another as the support graphical user interface. With such features of the second aspect of the invention, since an operation support program includes a support database for supporting a plurality of tasks that are different from one another and are carried out as a result of execution of a plurality of device control programs that are different from one another, it is possible to configure a graphical user interface for supporting a plurality of tasks that are different from one another and are carried out as a result of execution of an arbitrary device control program (i.e., support GUI) as the situation demands. Moreover, it is possible to offer Web service with great usability as ever-changing business scene demands. Execution environment, which is environment in which the operation support program is executed, is unique software/hardware environment for each arbitrary client computer.

(10) In the operation support program according to the second aspect of the invention, it is preferable that the detecting section should detect model configuration of a plurality of devices controlled by the plurality of device control programs. With such a preferred aspect of the invention, it is possible to configure support GUI depending on the model configuration of the plurality of devices.

(11) In the operation support program according to the second aspect of the invention, it is preferable that the detecting section should detect type configuration of the plurality of device control programs as the execution environment. With such a preferred aspect of the invention, it is possible to configure support GUI depending on the type configuration of the plurality of device control programs.

(12) In the operation support program according to the second aspect of the invention, it is preferable that the detecting section should detect statuses or logs of a plurality of devices controlled by the plurality of device control programs. With such a preferred aspect of the invention, it is possible to configure support GUI depending on the statuses or logs of the plurality of devices.

(13) In the operation support program according to the second aspect of the invention, it is preferable that the detecting section should detect current time as the execution environment. With such a preferred aspect of the invention, it is possible to configure support GUI on the arrival of predetermined date, time, day of the week or the like.

(14) In the operation support program according to the second aspect of the invention, it is preferable that the GUI configuring section should configure the support GUI in a single window. Such a preferred aspect of the invention makes it easier to carry out various tasks that are carried out as a result of execution of a plurality of device control programs that are different from one another.

(15) In order to offer the above advantages without any limitation thereto, an activation control program according to a third aspect of the invention causes a computer to function as constituent sections including: a detecting section that detects execution environment; a judging section that judges whether a predetermined specific situation has occurred or not on the basis of the execution environment; and an activating section that activates a support graphical user interface for supporting a plurality of tasks that are different from one another and are carried out as a result of execution of a plurality of device control programs that are different from one another with an interface configuration that is in accordance with the specific situation upon the occurrence of the specific situation, wherein a message selection of which triggers displaying of a web page for supporting the plurality of tasks that are different from one another is displayed as the support graphical user interface. With such features of the third aspect of the invention, upon the occurrence of a specific situation, it is possible to activate a support graphical user interface (support GUI) for supporting a plurality of tasks that are different from one another and are carried out as a result of execution of a plurality of device control programs that are different from one another with an interface configuration that is in accordance with the specific situation. Therefore, it is possible to always support a plurality of tasks that are different from one another and are carried out as a result of execution of a plurality of device control programs that are different from one another as the situation demands on a steady basis. Moreover, it is possible to offer Web service with great usability as ever-changing business scene demands. Execution environment, which is environment in which the operation support program is activated, is unique software/hardware environment for each arbitrary client computer.

(16) In the activation control program according to the third aspect of the invention, it is preferable that the detecting section should detect statuses or logs of a plurality of devices controlled by the plurality of device control programs. With such a preferred aspect of the invention, it is possible to configure support GUI depending on the statuses or logs of the plurality of devices.

(17) In the activation control program according to the third aspect of the invention, it is preferable that the detecting section should detect current time as the execution environment. With such a preferred aspect of the invention, it is possible to configure support GUI on the arrival of predetermined date, time, day of the week or the like.

(18) In the activation control program according to the third aspect of the invention, it is preferable that the support GUI should be configured in a single window. Such a preferred aspect of the invention makes it easier to carry out various tasks that are carried out as a result of execution of a plurality of device control programs that are different from one another.

The functions of constituent sections recited in appended claims can be embodied and/or implemented by means of hardware resources whose functions are defined by a program. The functions of the claimed constituent sections are not limited to those embodied and/or implemented by means of discrete hardware resources that are physically separated from and/or physically independent of one another. The invention encompasses, and thus can also be embodied as, a storage medium in which an operation support program is stored, an operation support apparatus, and an operation support system that includes an operation support apparatus and a support data distribution server. Needless to say, such an operation support program storage medium may be selected among various kinds of storage media including but not limited to a magnetic recording medium and a magneto-optic recording medium. In addition to these existing and known storage media, any new type of a storage medium that will be developed in future may be used as an operation support program storage medium according to an aspect of the invention.

BRIEF DESCRIPTION OF THE DRAWINGS

The invention will be described with reference to the accompanying drawings, wherein like numbers reference like elements.

FIG. 6 is a sequence chart according to an exemplary embodiment of the invention.

DESCRIPTION OF EXEMPLARY EMBODIMENTS

With reference to the accompanying drawings, exemplary embodiments of the present invention will now be explained in detail.

1. Overview

Figure 1:
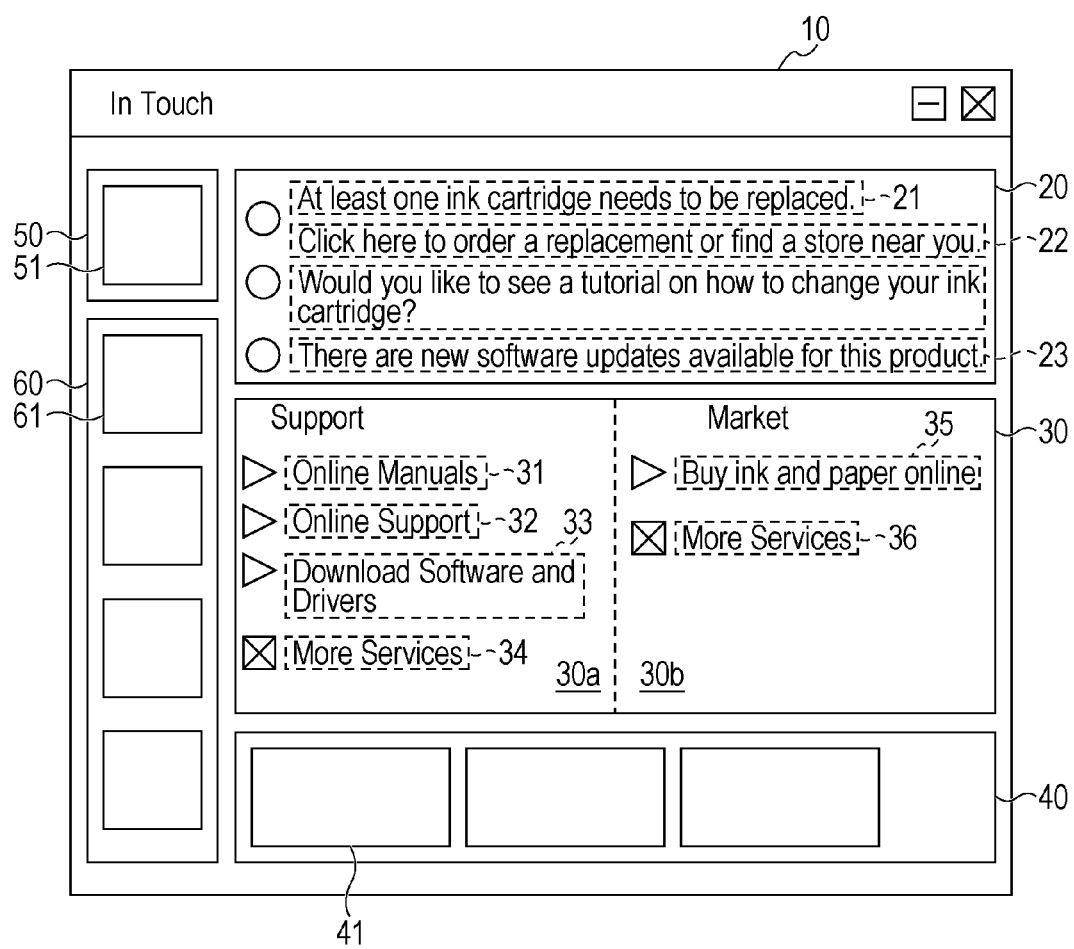
FIG. 1 is a diagram that schematically illustrates an example of the configuration of a window according to an exemplary embodiment of the invention.
Figure 2:
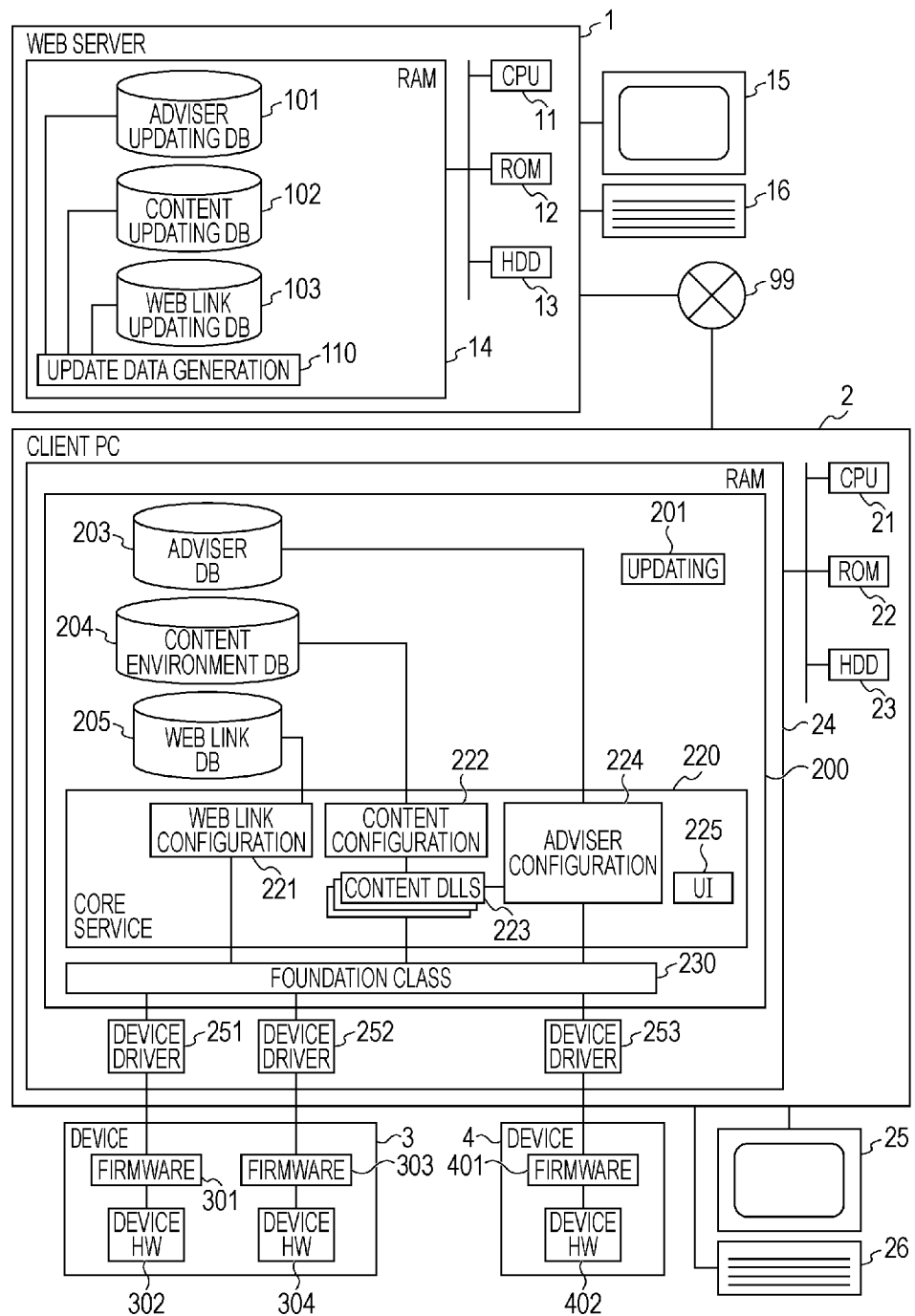
FIG. 2 is a block diagram according to an exemplary embodiment of the invention.

As illustrated in FIG. 2, an operation support system includes a Web server 1 and a client PC 2 that are connected to the Internet 99. The operation support system offers support GUI that is available on the client PC 2. The support GUI is a graphical user interface that provides a support for various tasks (e.g., operations or jobs) that can be executed by means of devices 3 and 4 that are connected to the client PC 2. Examples of the tasks are printing, facsimile reception, scanning, copying, replacement of consumable supplies, replenishment of consumable supplies, and purchase of consumable supplies. FIG. 1 is a diagram that schematically illustrates an example of a window that is displayed on a screen to make such support GUI available to a user. Various messages 21, 22, 23, 31, 32, 33, 34, 35, and 36 are displayed in a support window 10. Various links are embedded in the messages. These messages and links can be arbitrarily configured depending on the models of the devices 3 and 4 connected to the client PC 2, the serial numbers of the devices 3 and 4, OS (Operating System) in use, language in use, and locale in use. These messages and links can be changed as the status or log of the device 3, 4 changes. In addition, they can be changed when predetermined time of day has come. For example, businesses that commercialize the devices 3 and 4 on the market can register data for changing messages, links, and events triggering GUI configuration (a server data group) in the Web server 1 depending on ever-changing business scene, which improves both usability for the benefit of users and profit performance for the benefit of the businesses.

2. Configuration of Support GUI

With reference to FIG. 1, an example of support GUI that is displayed on the display screen of the client PC 2 by an operation support program 200 is explained below. The operation support program 200 provides support GUI in a single window (support window). The support GUI provides a support for various tasks that are different from one another. These different tasks are executed through the operation of a plurality of device drivers 251, 252, and 253. Five sub windows 20, 30, 40, 50, and 60 explained below are arranged in the support window 10.

Various messages 21, 22, and 23 for supporting tasks that are executed with the use of device drivers are displayed in an adviser window 20 depending on the models, statuses, logs, and serial numbers of devices, the types and versions of the device drivers, and execution environment such as OS in use, language in use, locale in use, time and date, and the like. These messages to be displayed in the adviser window 20 are configured depending on execution environment when the support window 10 is launched. In addition, they change as execution environment changes during a period of time in which the support window 10 is displayed. Various links are embedded in the messages 21, 22, and 23. For example, a link to a website in which consumable supplies used by the devices 3 and 4 are available, a link to a website in which update data for the device drivers 251, 252, and 253 of the devices 3 and 4 can be downloaded, a link to an HTML (Hyper Text Markup Language) guidance file for instructing how to use the devices 3 and 4, a link to an application program or a program module (i.e., program component) for displaying the statuses of the devices 3 and 4 are embedded in the messages 21, 22, and 23. These messages can be displayed as text in the adviser window 20. Or, they may be displayed in symbolic form (e.g., an exclamation mark, a question mark, or the like) or in graphic form. Examples of the content of the message displayed in the adviser window 20 are as follows:

A message that prompts users to replace an ink cartridge;

A message that prompts users to replace a toner cartridge;

A message that recommends users to purchase a supplier-authorized ink cartridge;

A message that recommends users to purchase a supplier-authorized toner cartridge;

A message that prompts users to replenish sheets of printing paper;

A message that recommends users to purchase supplier-authorized printing paper;

A message that prompts users to replace, replenish, or purchase other consumable supplies;

A message that prompts users to carry out the cleaning of a print head;

A message that prompts users to carry out other maintenance operation;

A message for raising alert against the use of a consumable item that is not authorized;

A message for reporting a paper jam;

A message for reporting other error;

A message that instructs users how to troubleshoot a paper jam;

A message that prompts users to check operating procedure;

A message that provides information on the remaining capacity of a waste ink tank;

A message that provides information on the model name of a device that has now been connected as a new device;

A message for querying a method for processing data stored in a newly connected device;

A message that provides information on available tasks that can be executed with the use of devices that are currently connected;

A message that prompts users to update programs relevant to devices that are currently connected;

A message that provides product recall information;

Other warning, prompting, recommending, guiding, reporting, alert-raising, and querying message relevant to devices that are currently connected;

Examples of a task that will be activated when triggered upon the selection of a message displayed in the adviser window 20 are as follows:

To display a web page in which users can purchase a supplier-authorized consumable item corresponding to a device that is currently connected on a different window, which is not the adviser window 20;

To display a web page in which users can purchase a supplier-authorized consumable item corresponding to a device that is currently connected in the adviser window 20;

To display an operation guidance message in the adviser window 20;

To display a guidance message or a reporting message for details in the adviser window 20;

To display a guidance message or a reporting message for details on a different window;

To run a program relevant to a device that is currently connected;

To display a web page in which update data for a program relevant to a device that is currently connected is available in the adviser window 20;

To display a web page in which update data for a program relevant to a device that is currently connected is available on a different window;

To initiate the downloading of update data for a program relevant to a device that is currently connected;

In summary, text, symbols, and/or images for supporting tasks as well as text, symbols, and/or images containing embedded links to web pages for supporting tasks are displayed in the adviser window 20.

A content window 30 is segmented in two sections, which are a support section 30*a* and a market section 30*b*. The content window 30 and the adviser window 20 explained above have a point in common in that messages for supporting tasks and messages with embedded links to web pages for supporting tasks are displayed therein depending on execution environment. As a point of difference between the adviser window 20 and the content window 30 described herein, messages displayed in the adviser window 20 change during a period of time in which the support window 10 is displayed, whereas messages displayed in the content window 30 are configured depending on execution environment at the time when the support window 10 is launched only. That is, the messages displayed in the content window 30 do not change during a period of time in which the support window 10 is displayed. Needless to say, however, the specification explained herein can be arbitrarily modified as a matter of design variation. That is, the messages displayed in the content window 30 may be changed during a period of time in which the support window 10 is displayed.

The support section 30*a* is a window section in which menus for using an online manual, an online support service, a download site, and the like are displayed. Links to websites, application programs, and program modules are embedded in messages 31, 32, and 33, which constitute the menus of the support section 30*a*. The market section 30*b* is a window section in which menus for purchasing supplier-authorized consumable items, supplier-authorized option parts, and the latest model of the devices 3 and 4 connected to the client PC 2 are displayed. Links to web pages at which supplier-authorized consumable items, supplier-authorized option parts, and the latest model of the devices 3 and 4 connected to the client PC 2 are on sale are embedded in a message 35, which constitutes a menu of the market section 30*b*.

Banners of businesses dealing in the devices 3 and 4 connected to the client PC 2 (Web banners) are displayed in a Web link window 40.

A selection window 50 is a sub window that shows information for identifying one device driver, among device drivers installed in the client PC 2, that is related to messages that are currently displayed in the adviser window 20, the content window 30, and the Web link window 40. In addition, the selection window 50 is used as a switching window for choosing one device or one device driver for which messages are to be displayed in the adviser window 20, the content window 30, and the Web link window 40. Accordingly, for example, an icon 51 that indicates one device among devices that are connected to the client PC 2 and/or text that indicates a device driver is displayed in the selection window 50. In addition, a widget for device switchover or device driver switchover is shown in the selection window 50. Or, icons or text strings each of which indicates one of a plurality of devices connected to the client PC 2 or one of a plurality of device drivers may be displayed in the selection window 50 as a list or a table. In addition, a cursor may be displayed together with the icons or the text strings so that users can switch the mode of icon/text display between a selected state and a non-selected state.

A shortcut window 60 is a sub window in which shortcuts for running various application programs that are related to devices connected to the client PC 2 are arranged.

3. Configuration of Operation Support System

FIG. 2 is a diagram that schematically illustrates an example of the hardware configuration and software configuration of an operation support system for configuring support GUI illustrated in FIG. 1. The Web server 1 is a computer that is provided with a CPU 11, a ROM 12, a hard disk drive (HDD) 13, a RAM 14, and an input/output interface that is not shown in the drawing. The client PC 2 is also a computer that is provided with a CPU 21, a ROM 22, an HDD 23, a RAM 24, and an input/output interface that is not shown in the drawing. A keyboard 16, 26, a display device 15, 25, a pointing device that is not illustrated in the drawing, and the like are connected to each of the Web server 1 and the client PC 2. The GUI of the Web server 1 and the client PC 2 is displayed on the display device 15, 25. It can be operated by means of the keyboard 16, 26 and the pointing device. An administrator of the Web server 1 uses the keyboard 16 and the pointing device to operate the Web server 1. The administrator can manage server data for updating an operation support program that is installed in an arbitrary client PC.

The operation support program 200 and various computer programs such as the device drivers 251, 252, and 253, which are examples of a plurality of device control programs according to an aspect of the invention, as well as OS that is not shown in the drawing are installed in the client PC 2. An update data distribution program is installed in the Web server 1. The update data distribution program is used for updating an operation support program that is installed in an arbitrary client PC.

These programs are loaded from the HDDs 13 and 23 into the RAM 14 and 24. Then, the CPUs 11 and 21 execute the loaded programs. The Web server 1 executes the update data distribution program, thereby functioning as an operation support data server. The client PC 2 executes the operation support program, thereby functioning as an operation support apparatus.

The operation support program 200 includes, as main module components, an updating unit 201, a core service unit 220, a foundation class 230, an adviser database (DB) 203, a content environment DB 204, and a Web link DB 205.

The adviser DB 203 and the content environment DB 204 are support databases in which data for supporting a plurality of tasks that are different from one another and are carried out as a result of execution of a plurality of device drivers that are different from one another is registered (e.g., defined, retained, or stored) in association with execution environment. Specifically, for each execution environment of the operation support program 200, messages that are necessary for configuring support GUI and links (URL, references, pointers, addresses, and the like) that are to be embedded in the messages are registered (defined, retained, or stored) in association with the execution environment in the adviser DB 203 and the content environment DB 204.

The core service unit 220 is a group of program modules (a group of program components) that causes the client PC 2 to function as a GUI configuring section according to an aspect of the invention that configures support GUI with the use of the adviser DB 203, the content environment DB 204, the Web link DB 205, and content DLL (Dynamic Link Library).

The core service unit 220 includes program modules such as a Web link configuration unit 221, a content configuration unit 222, a plurality of content DLLs 223, an adviser configuration unit 224, and a UI unit 225. The adviser configuration unit 224 acquires execution environment such as status logs, current time, and the like, of a plurality of devices controlled by a plurality of device drivers through the foundation class 230. The adviser configuration unit 224 generates resource data (GUI resource) for configuring support GUI depending on the execution environment in the adviser window 20. The content configuration unit 222 is a GUI resource for configuring the content window 30. Specifically, the content configuration unit 222 is made of one or more XML files. For each of the support section 30a and the market section 30b, messages as menu items are defined in association with the plurality of content DLLs 223 in the content configuration unit 222 as a GUI resource. The content DLLs 223 constitute a program module that is started up upon the selection of a message displayed on the basis of the content configuration unit 222. In addition, the content DLLs 223 constitute a program module for supporting a plurality of tasks that are different from one another and are carried out as a result of execution of a plurality of device drivers that are different from one another. The UI unit 225 is a program module that displays the support window 10 on a display screen on the basis of a GUI resource generated by the adviser configuration unit 224 and/or on the basis of the content configuration unit 222. In addition, the UI unit 225 starts up a task defined in the GUI resource.

The foundation class 230 is a program module that causes the client PC 2 to function as a detecting section according to an aspect of the invention. The foundation class 230 includes common device API that is used for detecting execution environment such as time and date, statuses or logs of a plurality of devices that is controlled by a plurality of device control programs through communication with OS and a plurality of device drivers.

The updating unit 201 is a program module that causes the client PC 2 to function as an update data acquiring section and an updating section according to an aspect of the invention. The updating unit 201 acquires update data for updating the operation support program 200 from the Web server 1 via communication lines. In addition, the updating unit 201 updates the adviser DB 203, the content environment DB 204, the Web link DB 205, and the content DLLs 223 on the basis of the acquired update data.

The update data distribution program, which causes the Web server 1 to function as an operation support data server, is mainly made up of an adviser updating DB 101, a content updating DB 102, a Web link updating DB 103, a transmission data generation unit 110, and program modules for managing the adviser updating DB 101, the content updating DB 102, the Web link updating DB 103. The adviser updating DB 101 is a database in which data for updating the adviser DB 203 in an arbitrary client PC is registered (defined, retained, or stored) in association with execution environment of an arbitrary operation support program. The content updating DB 102 is a database in which data for updating the content environment DB 204 in an arbitrary client PC is registered (defined, retained, or stored) in association with execution environment of an arbitrary operation support program. The Web link updating DB 103 is a database in which data for updating the Web link DB 205 in the client PC 2 is registered (defined, retained, or stored) in association with execution environment of an arbitrary operation support program.

4. Operation of Operation Support System

4.1. Overview of Operation

Support GUI that is configured in the client PC 2 is unified graphical user interface for supporting a plurality of tasks that are different from one another and are carried out as a result of execution of a plurality of device drivers that are installed in the client PC 2. This unified support GUI is provided in a single window (operation support window 10). Each device driver whose corresponding support GUI is configured by the operation support program 200 is registered (defined, retained, or stored) in the operation support program 200 when the device driver is installed. It is the foundation class 230 that registers the device driver in the operation support program 200. The foundation class 230 includes the device API that is configured as common API for performing communication with a plurality of device drivers. Therefore, it is easy to individually encode each of the various content dynamic link libraries (DLLs) 223 corresponding to various device drivers.

The configuration of support GUI changes depending on execution environment such as the statuses or logs of respective devices, time and date, and the like. The change occurs from moment to moment, that is, just after the displaying of the support window 10 and during the displaying of the support window 10. In addition, as will be explained later, the adviser DB 203, the content environment DB 204, the Web link DB 205, and the content DLLs 223 are automatically updated as the adviser updating DB 101, the content updating DB 102, the Web link updating DB 103 are updated in the Web server 1. Therefore, an operation support system that includes the Web server 1 and the client PC 2 makes it possible to support a plurality of tasks that are different from one another and are carried out as a result of execution of a plurality of device drivers that are different from one another in a finely-tuned and/or individually-targeted manner as the situation demands.

4.2. Activation of Support GUI

The operation support program 200 activates support GUI in response to user instructions and in response to a change in execution environment. Execution environment is detected in order to identify various situations in which the configuring of support GUI in the client PC 2 is beneficial for a user of the client PC 2 or for the administrator of the Web server 1. Execution environment, which is environment in which the operation support program 200 is executed, is unique software/hardware environment for each arbitrary client computer. Specific situations in which support GUI is activated automatically includes situations that are unique to a particular device that is identified by means of the status logs of devices that are connected to the client PC 2, spooler status, and the like and situations that are not unique to a particular device such as time and date or elapsed time and days, the constituents of a device group being connected, and the like. In order to activate support GUI in response to a change in execution environment, the operation support program 200 is configured as a resident program that is started up upon the launching of OS.

Figure 3:
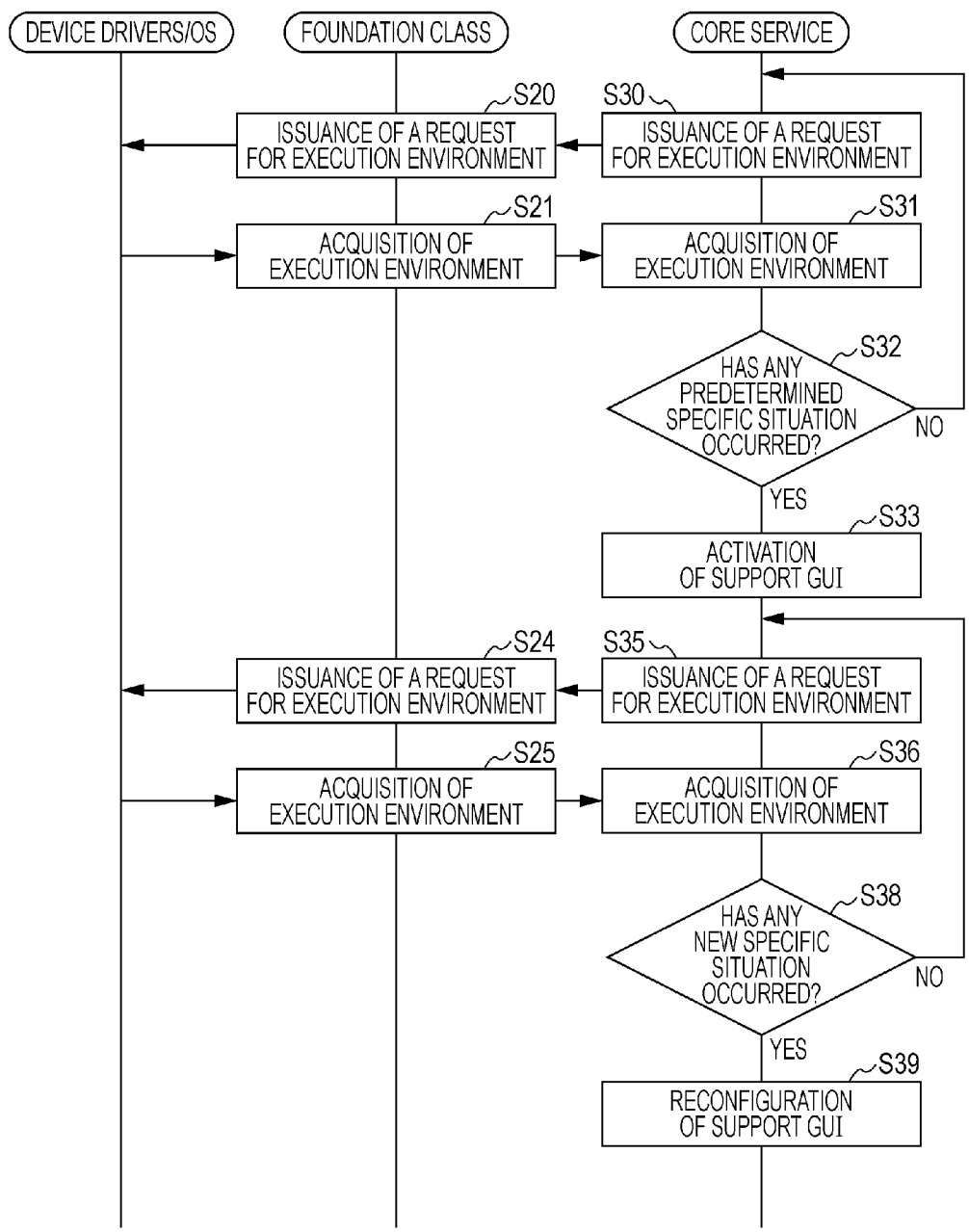
FIG. 3 is a sequence chart according to an exemplary embodiment of the invention.

As illustrated in FIG. 3, the core service unit 220 makes an inquiry about execution environment at predetermined time intervals (S30). The core service unit 220 acquires execution environment as a response to the query (S31). Execution environment includes the statuses of devices that can be acquired through device drivers (status held by firmware), the logs of the devices held by the device drivers, and statuses and logs held by OS. That is, devices that are connected to the client PC 2, device drivers that are installed in the client PC 2, and the OS of the client PC 2 hold data that represents execution environment. For example, the following information is registered (defined, retained, or stored) in the core service unit 220 as execution environment about which an inquiry is to be made to OS and device drivers. A query is issued for the registered execution environment.

Language in use that is registered in OS;
Locale in use that is registered in OS;
Type of OS;
Version of OS;
The last update date of OS;
Elapsed time from the last activation of OS or the last termination of the OS to the current activation of the OS;
Cumulative number of times of activation of OS;
Whether an ink cartridge has been set or not;
The remaining amount of ink in an ink cartridge;
The amount of ink that remains in an ink cartridge is zero ("ink-empty");
The amount of ink that remains in an ink cartridge is less than a predetermined amount ("ink-low");
Whether an ink cartridge is a supplier-authorized cartridge or a non-authorized cartridge;
Cumulative number of ink cartridges used;
Other status and log of an ink cartridge;
Cumulative number of pages printed;
Cumulative number of times of printing;
Cumulative number of times of a paper jam;
Cumulative number of times of the cleaning of an ink flow passage;
Cumulative number of times of the cleaning of a print head;
Cumulative number of times of the movement of a print head;
Waiting time until printing is completed;
Number of copies waiting in queue for printing/Number of sheets waiting in queue for printing;
Remaining sheets of paper for printing;
The number of sheets of printing paper that remains is zero;
Printing paper is now being replenished (e.g., the open/close state of a paper tray);
The last date of printing;
Number of days elapsed since the last date of printing;
The first date of printing;
Paper-jam;
Remaining capacity of a waste ink tank or amount of waste ink accumulated in the waste ink tank;
Cumulative number of times of scanning;
Version of a device driver;
Name of a device driver (type);
Constituents of a device driver group (name);
Model name of a device;
Manufacturer's serial number of a device;
Constituents of a device group being connected (model);
Ports of a client PC for connection to client-PC devices;
Identification name of a CPU;
Memory capacity or free capacity of a RAM;
Memory capacity or free capacity of a hard disk;
Enabled/Disabled state of a status monitor;
Current date, time, and day of the week;
Wireless LAN connection/Wired LAN connection
In-process (Busy);
Critical error of a device;
Status code;
Error code;
Alarm code;
Various error states (Whether an error has occurred or not);

As a reply to the inquiry for execution environment, the core service unit 220 acquires the execution environment through the foundation class 230. That is, the core service unit 220 uses the API of the foundation class 230 to request data that represents execution environment accessible to the device drivers 251, 252, and 253 and the OS (S30). Upon receiving a data request from the core service unit 220, the foundation class 230 makes a request for data that represents execution environment to the device drivers 251, 252, and 253 and the OS (S20). The foundation class 230 performs communication with the device drivers 251, 252, and 253 and the OS to acquire data that represents execution environment and then forwards the data to the core service unit 220 (S21). The core service unit 220 acquires the data representing execution environment through the API of the foundation class (S31).

Since the foundation class 230 includes the API that is configured as common API for performing communication with a plurality of device drivers to detect execution environment, it is not necessary to individually develop the core service unit 220 on the basis of differences in firmware configuration and device driver configuration. Therefore, even if the core service unit 220 is updated at each time when a new device is developed or when a device program is updated, it is possible to make updating cost substantially lower in comparison with related art. Specifically, the development environment of the plurality of content DLLs 223, the adviser configuration unit 224, and the Web link configuration unit 221, which are modules (i.e., components) of the core service unit 220, can be shared as common environment according to the API of the foundation class 230. Therefore, the development of them can be made technically easier. In addition, development cost can be reduced.

The request addressee from whom the data that represents execution environment can be acquired (OS, device driver, or firmware) depends on the design of OS, device drivers, and firmware. The foundation class 230 may detect, from a device driver, data that has been acquired by OS from the device driver and managed by the OS. The foundation class 230 may detect, from firmware, data that has been acquired by a device driver from the firmware and managed by the device driver.

Next, the core service unit 220 judges whether any predetermined specific situation has occurred or not on the basis of execution environment detected from OS and device drivers (S32). The specific situations are pre-defined in a range in which they can be identified on the basis of execution environment that can be acquired from OS and device drivers. For example, the following situations are registered (defined, retained, or stored) as the specific situations in the core service unit 220.

The ink level of an ink cartridge is low;
The amount of ink that remains in an ink cartridge is zero;
An ink cartridge is now being replaced;
The number of sheets of printing paper that remains is zero;
Printing paper is now being replenished (e.g., the open/close state of a paper tray);
Paper-jam;
The lapse of predetermined number of days or greater since the last printing date;
Waiting time until printing is completed will not be shorter than a predetermined time length;
The number of copies waiting in queue for printing is not less than a predetermined number;
The number of sheets waiting in queue for printing is not less than a predetermined number;

Occurrences of various errors;
The version of a device driver is older than a predetermined version;
The free capacity of a memory is smaller than predetermined capacity;
The free capacity of a hard disk is smaller than predetermined capacity;
A new device has now been connected;
The installing of a new device has occurred or completed;
The cumulative number of times of a paper jam is not smaller than a predetermined number of times;
The number of times of OS activation is within a predetermined range;
Elapsed time from the last activation of OS or the last termination of the OS to the current activation of the OS is within a predetermined range;
A port of a client PC for connection to a client-PC device has now been changed;
OS update;
A new device driver has now been installed;
Updating/Removal of a device driver;
The memory capacity of a RAM or the free capacity thereof is within a predetermined range;
The memory capacity of a hard disk or the free capacity thereof is within a predetermined range;
A predetermined date, time, or day of the week has come;
An unidentified device has now been connected;

If it is judged in S32 that a predetermined specific situation has occurred, the core service unit 220 activates support GUI (S33). If it is judged in S32 that a predetermined specific situation has not occurred, the process returns to S30.

The operation support program 200 configures support GUI depending on execution environment when support GUI is activated. That is, on the basis of the execution environment acquired in S31, the core service unit 220 configures support GUI in accordance with the execution environment (S33). Specifically, the adviser configuration unit 224 configures the adviser window 20 in accordance with the execution environment. The content configuration unit 222 configures the content window 30 in accordance with the execution environment. The details of configuring operation are as follows.

Figure 4:
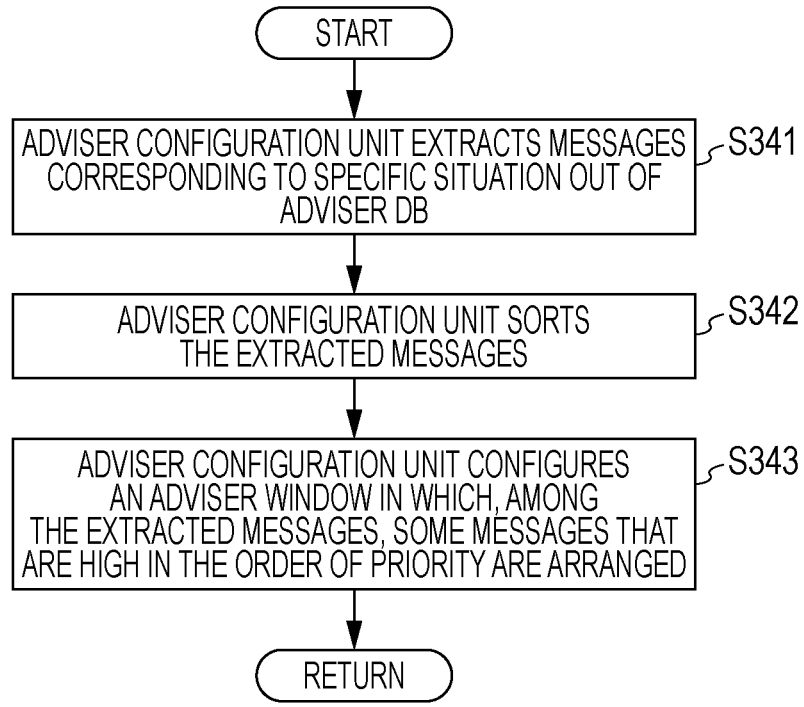
FIG. 4 is a flowchart according to an exemplary embodiment of the invention.

As illustrated in FIG. 4, the adviser configuration unit 224 extracts messages that correspond to execution environment out of the adviser DB 203 while using the execution environment as key (S341). Then, the adviser configuration unit 224 sorts the extracted messages in the order of priority (S342). Next, the adviser configuration unit 224 arranges, among the extracted messages, some messages that are high in the order of priority in the adviser window 20 (S343). In order to configure the adviser window 20 as explained above, the following data is defined in the adviser DB 203 for each message.
The content of a message;
Corresponding execution environment;
Order of priority (Priority level);
The expiration date of a message;
A link embedded in a message;

For example, message content is data that defines text, graphic, or symbol that is displayed as a message. The content may be an identifier of text, graphic, or symbol or a reference thereto. Or, the content may be text itself that is displayed as a message. Execution environment that corresponds to a message is defined as one or more variable values that represent the execution environment or as a conditional expression that includes the variable values. Accordingly, one message is extracted out of the adviser DB 203 in a case where a variable that represents the detected execution environment perfectly matches or coincides with a variable that represents execution environment corresponding to this one message. The following condition is taken for instance; a variable S1 representing execution environment has been acquired as the date of today; a variable S2 representing execution environment has been acquired as the model name of a device; a variable S3 representing execution environment has been acquired as the type of OS; a variable S4 representing execution environment has been acquired as language in use; and a variable S5 representing execution environment has been acquired as the remaining amount of ink in an ink cartridge. In this example, each message whose expiration date is not before S1, device model name is S2, OS type is S3, language in use that is registered in the OS is S4, and the remaining amount of ink in an ink cartridge is not greater than S5 could be extracted.

The arrangement of one or more extracted messages is determined on the basis of the order of priority defined for each of the extracted messages. Specifically, it is determined as follows. The number of messages that will be displayed in the adviser window 20 has been determined in advance. Messages to be displayed therein are selected in a sequential manner in accordance with the order of priority, which means that the message having the highest-order priority will be selected first. Then, selected messages to be displayed, the number of which has been determined in advance, are arranged sequentially in the adviser window 20 from the top to the bottom in accordance with the defined order of priority. Specifically, for example, the adviser configuration unit 224 controls the UI unit 225 on the basis of records corresponding to the messages selected to be displayed. The UI unit 225 generates a group of commands for configuring the adviser window 20. Then, OS displays the adviser window 20 on the basis of the generated group of commands. In the command group generated as GUI resource by the adviser configuration unit 224 and the UI unit 225, text, graphic, or symbol that is displayed as a message and a task that will be activated upon the selection of the message are defined on the basis of the adviser DB 203. Examples of a task that will be activated upon the selection of a message include the displaying of a document whose URL is defined as a hyperlink to the selected message or the launching of a program that is defined with a reference or a pointer in link with the selected message. That is, a group of commands for displaying messages with embedded links is generated. The adviser configuration unit 224 or the UI unit 225 may generate an HTML document as GUI resource. The adviser configuration unit 224 configures the adviser window 20 as explained above. The codes of the adviser configuration unit 224 define the above window configuration processing.

When processing for displaying messages corresponding to execution environment in the adviser window 20 is performed, the adviser configuration unit 224 may use an additional factor/element other than the execution environment as display conditions to select and arrange messages that will be displayed in the adviser window 20. For example, as explained above, the order of priority may be pre-defined for each message; in a case where the number of messages corresponding to execution environment is larger than a predetermined number, messages that will be displayed in the adviser window 20 may be selected and arranged in accordance with the order of priority. Or, for example, a period of validity that starts from a point in time at which a message is displayed for the first time may be defined for the message; each message whose validity period has expired may be excluded from messages that will be displayed in the adviser window 20. In this example, messages that do not meet the validity condition can be excluded by recording a point in time at which each message is displayed for the first time as the start of the validity period in association with the message. Or, as another example, the limit may be set for the number of times of display for each message. Each message whose number of times of display has exceeded the set limit may be excluded from messages that will be displayed in the adviser window 20. In this example, messages that do not meet the number-of-times-of-display condition can be excluded as follows. A counter is used to control the limited number of times of display for each message. For example, each time a message is displayed, the counter decrements the limited number of times of display that is set for the message by one. Each message whose remaining number of times of display is less than one is excluded from messages that will be displayed in the adviser window 20. Or, as another example, display/non-display type may be pre-defined for each message. Each "non-display" message is excluded from messages that will be displayed in the adviser window 20. With such type pre-definition, it is easy to perform a display/non-display switchover at the time of updating the operation support program 200.

4.3. Reconfiguration of Support GUI

After the activation of support GUI, the adviser configuration unit 224 acquires execution environment at specified time intervals through the foundation class 230 (S35, S24, S25, S36). The adviser configuration unit 224 reconfigures the adviser window 20 in response to a change in execution environment (S38, S39). That is, when a new specific situation arises, the adviser configuration unit 224 reconfigures the adviser window 20 in accordance with the new specific situation. The execution environment that is acquired by the adviser configuration unit 224 through the foundation class 230 for reconfiguration may be the same as the execution environment acquired at the time of the activation of support GUI. Or, they may be different from each other. In addition, the specific situation that triggers the reconfiguration of the adviser window 20 may be the same as the specific situation at the time of the activation of support GUI. Or, they may be different from each other.

Figure 5:
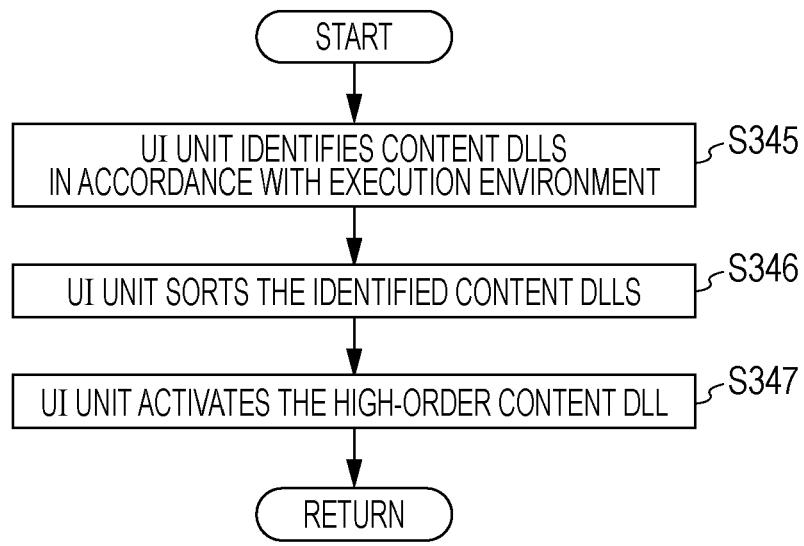
FIG. 5 is a flowchart according to an exemplary embodiment of the invention.

As illustrated in FIG. 5, when a user has selected a message displayed in the content window 30 by clicking it, the UI unit 225 refers to the content configuration unit 222 and the content environment DB 204 to identify content DLLs 223 that correspond to the selected message (S345). The UI unit 225 sorts the identified content DLLs 223 in accordance with the order of priority defined in the content environment DB 204 (S346). Then, the UI unit 225 activates the high-order content DLL 223 while referring to the content configuration unit 222 (S347). The activated content DLL 223 supports a task carried out as a result of execution of a particular device control program through processing on the basis of the code of the content DLL 223. Since the content DLL 223 itself is a program module, the activated content DLL 223 can embody any kind of processing by functioning in cooperation with other program modules such as the content configuration unit 222, the foundation class 230, and the adviser configuration unit 224. For example, the content DLL 223 may be used for reconfiguring the content window 30 in response to a change in execution environment in the same manner as in the reconfiguration of the adviser window 20 by the adviser configuration unit 224. Or, it may perform communication with the adviser configuration unit 224 for controlling the adviser configuration unit 224. Or, a website on which users can purchase consumable supplies may be displayed on a different window. In order to configure the content window 30 as explained above, for example, the following information is registered (e.g., defined, retained, or stored) in the records of the content environment DB 204 and in the content configuration unit 222 in association with one another.

Name of content DLL;
Version of content DLL;
Target OS;
Target area;
Target model name;
Order of priority (Priority level);
Section name (support section/market section);
The name of a file into which corresponding content DLL has been compressed;
The name of a content-DLL executable file;
The URL of a Web server that distributes corresponding update data;
The name of a folder that is installed in a client PC;

The Web link window 40, the selection window 50, and the shortcut window 60 may be configured depending on predetermined order of priority, execution environment, or the configuration of other sub windows. For example, a URL parameter that is sent to a Web server with which a client PC performs communication upon the selection of a banner displayed in the Web link window 40 may be dynamically generated depending on execution environment that is acquired by the Web link configuration unit 221 from OS and device drivers through the foundation class 230. Such dynamic generation of a URL parameter depending on execution environment that is acquired from OS and device drivers makes it possible to offer finely-tuned and/or individually-targeted Web-server-linked service according to the situation/status of an arbitrary client PC while simplifying the content configuration unit 222 that is subjected to coding for the purpose of configuring the Web link window 40. The icon 51 or text that indicates a device corresponding to messages displayed as high-order messages in the adviser window 20 is displayed in the selection window 50. Conversely, messages corresponding to a device selected in the selection window 50 only may be displayed in the adviser window 20. Or, the order of priority for messages corresponding to a device selected in the selection window 50 may be set higher than the order of priority for messages corresponding to other devices.

4.4. Updating of Operation Support Program

As explained earlier, support GUI that is configured as a result of the execution of the operation support program 200 is configured dynamically depending on execution environment. If processing for automatically updating an operation support program, which is explained below, is used, it is possible to carry out unified management on the automatic updating of a support database or a plurality of support program components (e.g., support program modules) for supporting a plurality of tasks that are different from one another and are carried out as a result of execution of a plurality of device drivers that are different from one another. Therefore, it is possible to actualize the flexible configuration of support GUI in response to a change in business scene that occurs after the release of the operation support program 200.

Support GUI can be changed after the release of the operation support program 200 by updating individual program modules, databases, and data files that constitute the operation support program. If update processing as well as program structure for updating is designed as explained below, it is possible to reduce the burden of program development for updating, and in addition, to reduce processing load and data communication traffic for updating, which makes it easier to perform frequent updating with enhanced user friendliness.

In the operation support program 200, messages and tasks are registered (defined, retained, or stored) in association with execution environment so that the configuration of the adviser window 20 can be optimized for each given execution environment without updating program modules. Specifically, it is possible to change the configuration of the adviser window 20 in response to a change in business scene just by updating the adviser DB 203.

As explained earlier, the foundation class 230 includes device API that is configured as common API for performing communication with a plurality of device drivers. Therefore, even in a case where program modules are updated in order to optimize the configuration of the content window 30 for each given execution environment, it is possible to develop program modules in a common development environment irrespective of the models of devices that are connected to a client PC and versions of device drivers. Specifically, when the content DLL 223 is developed for each device model, each device driver name, and each device driver version, it is possible to develop various content DLLs 223 at low cost in a common development environment.

In order for the Web server 1 to carry out unified management on the updating of an arbitrary operation support program that is installed in arbitrary one of client PCs under various environments, it is preferable that the Web server 1 should distribute, to each client PC, update data corresponding to execution environments and versions of operation support programs that differ from one client PC to another. By this means, it is possible to reduce traffic in data communications and reduce the data size of the operation support program 200 that is memorized in each client PC. Therefore, it is preferable to update the operation support program 200 according to the procedure of periodic update processing illustrated in FIG. 6.

In the periodic update processing, as a first step, the updating unit 201 judges whether a predetermined time period (update interval time period: e.g., 24 hours) has elapsed or not since the last update (S40). The updating unit 201, which is a module of the operation support program 200, may perform the judgment processing of S40 during the execution of the operation support program 200. Or, a resident program may perform the judgment processing irrespective of the execution state of the operation support program 200.

If the predetermined update interval time period has already elapsed, the updating unit 201 transmits update environment information and a client update record to the Web server 1 as update control information (S41). As will be explained later, the client update record is the last server update record received from the Web server 1 no later than the predetermined hours or the like set as the update interval time period before. In addition, the client update record is information that indicates the last update time of the operation support program 200 in a client PC. That is, the client PC 2 memorizes the last server update record received from the Web server 1 as the client update record until the client PC 2 transmits this server update record to the Web server 1. The update environment information that is transmitted to the Web server 1 is information that is required for acquiring update data in accordance with the execution environment of the operation support program 200. In addition, the update environment information is information that corresponds to the execution environment of the operation support program 200. For example, the update environment information contains the following items.

Type of OS;
Version of OS;
Language in use that is registered in OS;
Locale in use that is registered in OS;
Model name of a device;
Identification name of a device driver;
Version of a device driver;

Upon receiving the update environment information and the client update record from a client PC, the Web server 1 generates a server update record that indicates the last update time of an arbitrary record corresponding to the execution environment of the operation support program 200 in the client PC identified on the basis of the update environment information and then compares time indicated by the client update record received from the client PC with time indicated by the server update record to judge whether the former agrees with the latter or not (S50). Each time the Web server 1 updates a record for updating the operation support program 200 of an arbitrary client PC, unique identifiers such as update date, version, and the like are updated for each record. Therefore, in a case where any record corresponding to the operation support program 200 that is unique to the client PC 2 has been updated at the Web server 1 during a time period from the transmission of the last (i.e., preceding) server update record to the client PC 2 to the reception of the current client update record, the time indicated by the server update record and the time indicated by the client update record disagree. Note that the server update record itself represents time. The client update record is a previous server update record. Therefore, a judgment as to whether the time indicated by the server update record and the time indicated by the client update record agree or disagree is equivalent to a judgment as to whether the server update record and the client update record agree or disagree.

If the server update record does not agree with the client update record, the Web server 1 transmits a server update code that indicates the last update state of a server data group that corresponds to the operation support program 200 that is unique to the client PC 2 together with a server update record to the client PC 2 (S51). The server data group is a data group that corresponds to the operation support program 200 that is unique to the client PC 2 among all data registered in the adviser updating DB 101, the content updating DB 102, the Web link updating DB 103, and the like. The last update state of a server data group is identified on the basis of individual data that constitute the server data group, program update date, version, and the like.

Upon receiving the server update code, the updating unit 201 of the client PC 2 compares the server update code with a client update code to identify program modules and/or databases that need to be updated (S42). The client update code is made up of unique identifiers that are managed by the updating unit 201 for each of data and program modules that constitute the operation support program 200. Examples of the identifiers are update date and version. Though such a client update code may be generated at each time when a server update code is received, it is preferable to perform control while updating it at each time when data and/or program modules are updated in the client PC 2. By this means, it is possible to reduce processing load for the generation of a client update code.

Next, the client PC 2 requests the Web server 1 to transmit data that are necessary for bringing program modules and data that are not in the latest condition up to date as update data (S44). The program modules and data that are not in the latest condition are program modules and data that need to be updated, that is, are not in synchronization with the server data group. When the client PC 2 makes a request for the update data to the Web server 1, the client PC 2 transmits information for identifying the program modules and the data that need to be updated (e.g., identifiers of the program/data).

Upon receiving the request for the update data, the Web server 1 creates data that are required by the client PC 2 for updating the program modules and the data that need to be updated with reference to the adviser updating DB 101, the content updating DB 102, the Web link updating DB 103 as update data; then, the Web server 1 transmits the update data to the client PC 2 (S52).

After the transmission of the update data, the Web server 1 transmits a completion notice to the client PC 2 (S53). The update data may be differential data for adding or deleting a difference between program/data before updating and program/data after updating. Or, the update data may be complete data for rewriting the entirety of program or data that needs to be updated.

If the time indicated by the server update record agrees with the time indicated by the client update record, the Web server 1 transmits a completion notice to the client PC 2 without transmitting any of the server update record, the server update code, and the update data (S53).

Upon receiving the completion notice, the updating unit 201 of the client PC 2 judges whether it is necessary to carry out updating or not (S44). That is, the client PC 2 judges that it is necessary to carry out updating if both the update data and the completion notice have been received. The client PC 2 judges that it is not necessary to carry out updating if the completion notice has been received but neither of the server update record and the update data has been received.

As a result, at the client PC 2 that has now received the update data and the completion notice, the adviser DB 203, the content environment DB 204, the Web link DB 205, and the content DLLs 223 are updated on the basis of the updated data received by the updating unit 201 (S45). Specifically, for example, the records of the adviser DB 203, the content environment DB 204, and the Web link DB 205 are changed or deleted. Or, records are added to the stored records of the adviser DB 203, the content environment DB 204, and the Web link DB 205. Or, the content DLLs 223 installed in the client PC 2 are changed or deleted. Or, additional content DLLs are installed in the client PC 2.

On the other hand, if the client PC 2 has received the completion notice without receiving the server update record and the update data, the client PC 2 does not make a request for the update data to the Web server 1. Nor does the client PC 2 update the adviser DB 203, the content environment DB 204, the Web link DB 205, and the content DLLs 223. Accordingly, the periodic update processing is terminated without requesting the update data or updating the DBs 203, 204, and 205 and the DLLs 223. In this case, since data that is exchanged between the Web server 1 and the client PC 2 is practically limited to the update environment information, the client update record, and the completion notice, the amount of data transmitted via the network can be minimized.

5. Other Embodiments

The technical scope of the invention is not limited to the foregoing exemplary embodiment. Needless to say, the invention can be modified in various ways within a range not departing from the gist of the invention. For example, the configuration of modules of the operation support program that is described in the foregoing embodiment is a mere example that is given for the purpose of facilitating the understanding of the concept of the invention.

What is claimed is:

1. A storage medium in which an operation support program is stored, the operation support program including a support database or a plurality of support program components for supporting a plurality of tasks that are different from one another and are carried out as a result of execution of a plurality of device control programs that are different from one another, the operation support program causing a computer to function as constituent sections comprising:
   an update data acquiring section that establishes connection with a server at predetermined timing to acquire update data for updating the support database or the plurality of support program components from the server via communication lines;
   an updating section that updates the support database or the plurality of support program components on the basis of the update data; and
   a graphical user interface configuring section that configures a support graphical user interface for supporting the plurality of tasks that are different from one another by utilizing the support database or the plurality of support program components,
   wherein the update data acquiring section transmits update control information for acquiring the update data in accordance with types of the plurality of device control programs to the server,
   the update data acquiring section receives a server update record that indicates the last update time of the update data corresponding to the update control information at the server from the server,
   the update data acquiring section transmits a preceding server update record, which was acquired the last time, as a client update record to the server, and
   if time indicated by a current server update record, which has been acquired this time, does not agree with time indicated by the client update record, the update data acquiring section acquires the update data from the server and updates the preceding server update record acquired the last time into the current server update record acquired this time.

2. The storage medium according to claim 1 in which the operation support program is stored, the operation support program causing the computer to function as the constituent sections recited therein,
   wherein the update control information includes a client update code that indicates the last update state of the support database or the plurality of support program components;
   if the current server update record acquired this time does not agree with the client update record, the update data acquiring section acquires a server update code that indicates the last update state of a server data group that corresponds to the plurality of device control programs from the server;
   the update data acquiring section makes a request to the server for the update data that is necessary for updating the support database that is not in the latest condition or the plurality of support program components that are not in the latest condition on the basis of the client update code and the server update code; and
   the update data acquiring section acquires the update data created from the server data group from the server.

3. The storage medium according to claim 1 in which the operation support program is stored, the operation support program causing the computer to function as the constituent sections further comprising:
   a detecting section that detects execution environment,
   wherein the graphical user interface configuring section configures the support graphical user interface in accordance with the execution environment.

4. The storage medium according to claim 3 in which the operation support program is stored, the operation support program causing the computer to function as the constituent sections recited therein,
wherein the detecting section detects statuses or logs of a plurality of devices controlled by the plurality of device control programs.

5. The storage medium according to claim 4 in which the operation support program is stored, the operation support program causing the computer to function as the constituent sections recited therein,
wherein the detecting section includes device API that is configured as common API for performing communication with the plurality of device control programs to detect the execution environment.

6. The storage medium according to claim 3 in which the operation support program is stored, the operation support program causing the computer to function as the constituent sections recited therein,
wherein the detecting section detects current time as the execution environment.

7. The storage medium according to claim 1 in which the operation support program is stored, the operation support program causing the computer to function as the constituent sections recited therein,
wherein the graphical user interface configuring section configures the support graphical user interface in a single window.

8. The storage medium according to claim 1 in which the operation support program is stored, the operation support program causing the computer to function as the constituent sections recited therein,
wherein the graphical user interface configuring section displays a message selection of which triggers displaying of a web page for supporting the plurality of tasks that are different from one another by utilizing the support database or the plurality of support program components.

9. A storage medium in which an operation support program is stored, the operation support program including a support database for supporting a plurality of tasks that are different from one another and are carried out as a result of execution of a plurality of device control programs that are different from one another, the operation support program causing a computer to function as constituent sections comprising:
a detecting section that detects execution environment; and
a graphical user interface configuring section that changes configuration of a support graphical user interface for supporting the plurality of tasks that are different from one another by utilizing the support database in response to a change in the execution environment,
wherein the graphical user interface configuring section displays a message selection of which triggers displaying of a web page for supporting the plurality of tasks that are different from one another as the support graphical user interface.

10. The storage medium according to claim 9 in which the operation support program is stored, the operation support program causing the computer to function as the constituent sections recited therein,
wherein the detecting section detects model configuration of a plurality of devices controlled by the plurality of device control programs.

11. The storage medium according to claim 9 in which the operation support program is stored, the operation support program causing the computer to function as the constituent sections recited therein,
wherein the detecting section detects type configuration of the plurality of device control programs as the execution environment.

12. The storage medium according to claim 9 in which the operation support program is stored, the operation support program causing the computer to function as the constituent sections recited therein,
wherein the detecting section detects statuses or logs of a plurality of devices controlled by the plurality of device control programs.

13. An operation support program having features recited in claim 9,
wherein the detecting section detects current time as the execution environment.

14. The storage medium according to claim 9 in which the operation support program is stored, the operation support program causing the computer to function as the constituent sections recited therein,
wherein the graphical user interface configuring section configures the support graphical user interface in a single window.

15. A storage medium in which an activation control program is stored, the activation control program causing a computer to function as constituent sections comprising:
a detecting section that detects execution environment;
a judging section that judges whether a predetermined specific situation has occurred or not on the basis of the execution environment; and
an activating section that activates a support graphical user interface for supporting a plurality of tasks that are different from one another and are carried out as a result of execution of a plurality of device control programs that are different from one another with an interface configuration that is in accordance with the specific situation upon the occurrence of the specific situation,
wherein a message selection of which triggers displaying of a web page for supporting the plurality of tasks that are different from one another is displayed as the support graphical user interface.

16. The storage medium according to claim 15 in which the activation control program is stored, the activation control program causing the computer to function as the constituent sections recited therein,
wherein the detecting section detects statuses or logs of a plurality of devices controlled by the plurality of device control programs.

17. The storage medium according to claim 15 in which the activation control program is stored, the activation control program causing the computer to function as the constituent sections recited therein,
wherein the detecting section detects current time as the execution environment.

18. The storage medium according to claim 15 in which the activation control program is stored, the activation control program causing the computer to function as the constituent sections recited therein,
wherein the support graphical user interface is configured in a single window.

* * * * *